(12) United States Patent
Aoki et al.

(10) Patent No.: US 6,390,947 B1
(45) Date of Patent: May 21, 2002

(54) HYDRAULIC CIRCUIT USED FOR AUTOMATIC TRANSMISSION OF VEHICLE HAVING AUTOMATIC ENGINE-STOP SYSTEM, AND OIL-PRESSURE CONTROL SYSTEM AND METHOD

(75) Inventors: Takashi Aoki; Eijiro Shimabukuro, both of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,019

(22) Filed: Jul. 28, 2000

(30) Foreign Application Priority Data

Jul. 29, 1999 (JP) .............................. 11-215986
Jul. 19, 2000 (JP) ........................ 2000-219393

(51) Int. Cl.[7] ........................ B60K 41/14; F16H 61/00
(52) U.S. Cl. .............................. 477/3; 477/45; 477/156
(58) Field of Search ............................... 477/3, 45, 156

(56) References Cited

U.S. PATENT DOCUMENTS 4,195,720 A  * 4/1980  Usui et al. ...................... 477/82
5,839,084 A  * 11/1998 Takasaki et al. ............... 477/36
5,944,632 A  * 8/1999  Hara et al. ..................... 477/158
6,176,808 B1 * 1/2001  Brown et al. ...................... 477/3
6,258,008 B1 * 7/2001  Tabata et al. .................. 477/107
6,269,895 B1 * 8/2001  Tanuguchi .................... 180/65.2
6,275,759 B1 * 8/2001  Nakajima et al. .............. 701/54

FOREIGN PATENT DOCUMENTS

JP          10-324177          12/1998

* cited by examiner

Primary Examiner—Sherry Estremsky
(74) Attorney, Agent, or Firm—Armstrong, Westerman & Hattori, LLP

(57) ABSTRACT

A hydraulic circuit for controlling the oil pressure supplied to an automatic transmission of a vehicle which has a mechanical oil pump, driven by an engine, for supplying hydraulic oil to the automatic transmission and which has an automatic engine-stop system is disclosed, by which the rise speed of the oil pressure for driving the automatic transmission can be increased when the engine is restarted, and the delay of the response for starting the vehicle can be decreased. In the hydraulic circuit, a bypass passage for connecting the suction side and the supply side of the mechanical oil pump is provided; and an electric oil pump is connected to the bypass passage in a manner such that the mechanical oil pump and the electric oil pump are arranged in parallel.

8 Claims, 8 Drawing Sheets

HYDRAULIC CIRCUIT USED FOR AUTOMATIC TRANSMISSION OF VEHICLE HAVING AUTOMATIC ENGINE-STOP SYSTEM, AND OIL-PRESSURE CONTROL SYSTEM AND METHOD

BACKGROUND OF THE INVENTION

1. Field of the Invention

The present invention relates to a hydraulic circuit for controlling the oil pressure supplied to the automatic transmission of a vehicle having an automatic engine-stop system, in particular, to a hydraulic circuit for quickly supplying the desired oil pressure to the automatic transmission.

2. Description of the Related Art

Conventionally, vehicles having an automatic engine-stop system are known, wherein the engine is stopped according to the driving conditions of the vehicle, and the engine is restarted when specific conditions are satisfied. In such vehicles, fuel consumption can be reduced by suitably stopping the engine. However, if the automatic engine-stop system is applied to vehicles having an automatic transmission, the oil-pressure pump is also stopped together with the engine; thus, it is necessary to maintain the oil pressure controlled by a hydraulic circuit of the automatic transmission.

Japanese Unexamined Patent Application, First Publication, No. Hei 10-324177 discloses an example of the hydraulic circuit for controlling the oil pressure supplied to the automatic transmission of a vehicle having the automatic engine-stop system.

The disclosed vehicle is a hybrid vehicle which can be driven by suitably using an engine, a first motor/generator, and a second motor/generator. The disclosed system comprises the second motor/generator for generating creep during the driving of the vehicle, an automatic transmission coupled with the engine via a torque converter, a first oil-pressure pump driven by the engine, a manual valve, and a second oil-pressure generating means which can supply an oil pressure by which the forward and backward clutches are set in the state immediately before the engagement. As shown in FIG. 8, the second oil-pressure generating means 50 comprises a second oil-pressure pump 52 driven by an electric motor 51, a first check valve 54 for restricting the flow from the manual valve 53 to the second oil-pressure pump 52, a relief valve 55, and a second check valve 57 for restricting the flow from the manual valve 53 to the first oil-pressure pump 56. In FIG. 8, reference symbol E indicates an engine, reference numeral 58 indicates a forward clutch, reference numeral 58 indicates a backward clutch 59, reference numeral 60 indicates hydraulic equipment, and reference numeral 61 indicates a first oil-pressure generating means 61.

However, in the above conventional technique, the second check valve 57 is necessary even in the most simplified structure (as shown above) employing a second oil-pressure generating source. That is, while the engine E is stopped, the second check valve 57 is necessary for preventing the oil pressure from acting on the first oil-pressure generating means 61 if hydraulic oil is supplied from the second oil-pressure generating means 50 to manual valve 53.

Therefore, in order to manufacture a hybrid vehicle having the above-explained structure, the second check valve 57 is necessary in the hydraulic circuit of the automatic transmission of the first oil-pressure generating means 61; thus, presently available (or known) automatic transmissions cannot be used as they are, and must be modified, thereby increasing the necessary cost.

Accordingly, an improved structure without the above second check valve is required in which a presently available automatic transmission can be used as it is.

SUMMARY OF THE INVENTION

In consideration of the above circumstances, an objective of the present invention is to provide a hydraulic circuit for controlling the oil pressure supplied to the automatic transmission of a vehicle having an automatic engine-stop system, by which (i) the rise speed of the oil pressure for driving the automatic transmission can be increased when the engine is restarted, (ii) the delay of the response for starting the vehicle can be decreased, and (iii) the hydraulic circuit of a presently available automatic transmission can be used.

Therefore, the present invention provides a hydraulic circuit for controlling the oil pressure supplied to an automatic transmission of a vehicle which has a mechanical oil pump, driven by an engine, for supplying hydraulic oil to the automatic transmission and which has an automatic engine-stop system, wherein:

a bypass passage for connecting the suction side and the supply side of the mechanical oil pump is provided; and an electric oil pump is connected to the bypass passage in a manner such that the mechanical oil pump and the electric oil pump are arranged in parallel.

According to the above structure, while the engine is stopped, the electric oil pump can be operated so as to fill the oil path of the automatic transmission with hydraulic oil. Therefore, it is possible to prevent a delay in the rise of the oil pressure when the engine is restarted, and to prevent a delay of the response for starting the vehicle.

The hydraulic circuit may comprise:

a check valve, inserted in the bypass passage at the supply side of the electric oil pump, for preventing back flow of the hydraulic oil from the mechanical oil pump to the electric oil pump; and a first pressure adjusting device (such as a relief valve), provided between the check valve and the electric oil pump, for adjusting a discharge pressure of the electric oil pump.

According to this structure, it is possible to prevent back flow of the hydraulic oil from the mechanical oil pump to the electric oil pump side of the hydraulic circuit while the mechanical oil pump is operated. According to the first pressure adjusting device, it is possible to protect the electric oil pump side of the hydraulic circuit. Therefore, it is possible to prevent the electric oil pump from being damaged.

The hydraulic circuit may further comprise second pressure adjusting device (such as a relief valve) for adjusting the discharge pressure of the electric oil pump, where the set pressure of the first pressure adjusting device is smaller than the set pressure of the second pressure adjusting device.

According to this structure, it is possible to prevent the oil pressure, which is generated from the electric oil pump side of the hydraulic circuit, from discharging from the second pressure adjusting device at the mechanical oil pump side. Therefore, the set pressure of the first pressure adjusting device can be small, and the pumping operation of the electric oil pump can be decreased.

Typically, the bypass passage, the electric oil pump, the check valve, and the first pressure adjusting device are added and attached to the oil path as a unit. Accordingly, in the manufacturing process, the present hydraulic circuit can be easily attached to a presently available mass-produced automatic transmission having a simple structure, thereby decreasing the manufacturing cost.

Preferably, the electric oil pump is activated according to a command for stopping the engine, while the electric oil pump is stopped after the engine is restarted and a predetermined time has elapsed. Accordingly, the driving time of the electric oil pump can be minimized. Therefore, the electric oil pump is not operated unnecessarily, so that the power consumption can be reduced and the durability of the electric oil pump can be improved.

The present invention also provides an oil-pressure control system for controlling a hydraulic circuit as explained above, the system comprising:

an electric oil pump controlling section (for example, motor ECU 11 in the embodiments) for activating the electric oil pump if the section receives an engine stop command for stopping the engine (refer to step S43 in the embodiments), and stopping the electric oil pump if the section receives an engine start command for restarting the engine (refer to step S42 in the embodiments), wherein the electric oil pump controlling section stops the electric oil pump when a predetermined time has elapsed after the engine restart.

The present invention also provides an oil-pressure control method for controlling a hydraulic circuit as explained above, the method comprising the step of:

activating the electric oil pump if an engine stop command for stopping the engine is received, and stopping the electric oil pump if an engine start command for restarting the engine is received, wherein the electric oil pump is stopped when a predetermined time has elapsed after the engine restart.

Accordingly, the operation of the electric oil pump can be stopped when a predetermined time has elapsed after the engine restart, and it is possible to minimize the operation time of the electric oil pump. Therefore, no unnecessary operation of the electric oil pump is performed, and thus power consumption can be reduced and the durability of the electric oil pump can be improved.

The present invention also provides an oil-pressure control system for controlling a hydraulic circuit as explained above, the system comprising:

an electric oil pump controlling section for activating the electric oil pump if the section receives an engine stop command for stopping the engine (refer to step S60 in the embodiments), and stopping the electric oil pump if the section receives an engine start command for restarting the engine (refer to step S59 in the embodiments), wherein after the engine restart, the electric oil pump controlling section determines whether the combustion in the engine has reached a specific maximum level, and stops the electric oil pump when it is determined that the combustion in the engine has reached the specific maximum level.

The present invention also provides an oil-pressure control method for controlling a hydraulic circuit as explained above, the method comprising the step of:

activating the electric oil pump if an engine stop command for stopping the engine is received, and stopping the electric oil pump if an engine start command for restarting the engine is received, wherein after the engine restart, it is determined whether the combustion in the engine has reached a specific maximum level, and the electric oil pump is stopped when it is determined that the combustion in the engine has reached the specific maximum level.

Accordingly, the operation of the electric oil pump can be stopped when it is determined that the combustion in the engine has reached the specific maximum level; thus, it is possible to minimize the operation time of the electric oil pump. Therefore, also in this case, no unnecessary operation of the electric oil pump is performed, and thus power consumption can be reduced and the durability of the electric oil pump can be improved.

DESCRIPTION OF THE PREFERRED EMBODIMENTS

Hereinafter, an embodiment according to the present invention will be explained with reference to the drawings. This embodiment discloses a vehicle having an automatic engine-stop system, wherein the engine stop is permitted when all of a set of predetermined conditions are satisfied, for example: the vehicle speed is zero, the accelerator pedal is OFF (i.e., not depressed), the brake pedal is ON (i.e., depressed), and the state of charge of the battery (i.e., remaining battery charge) is equal to or above a predetermined value. The engine is started when one of the above conditions is released.

Figure 1:
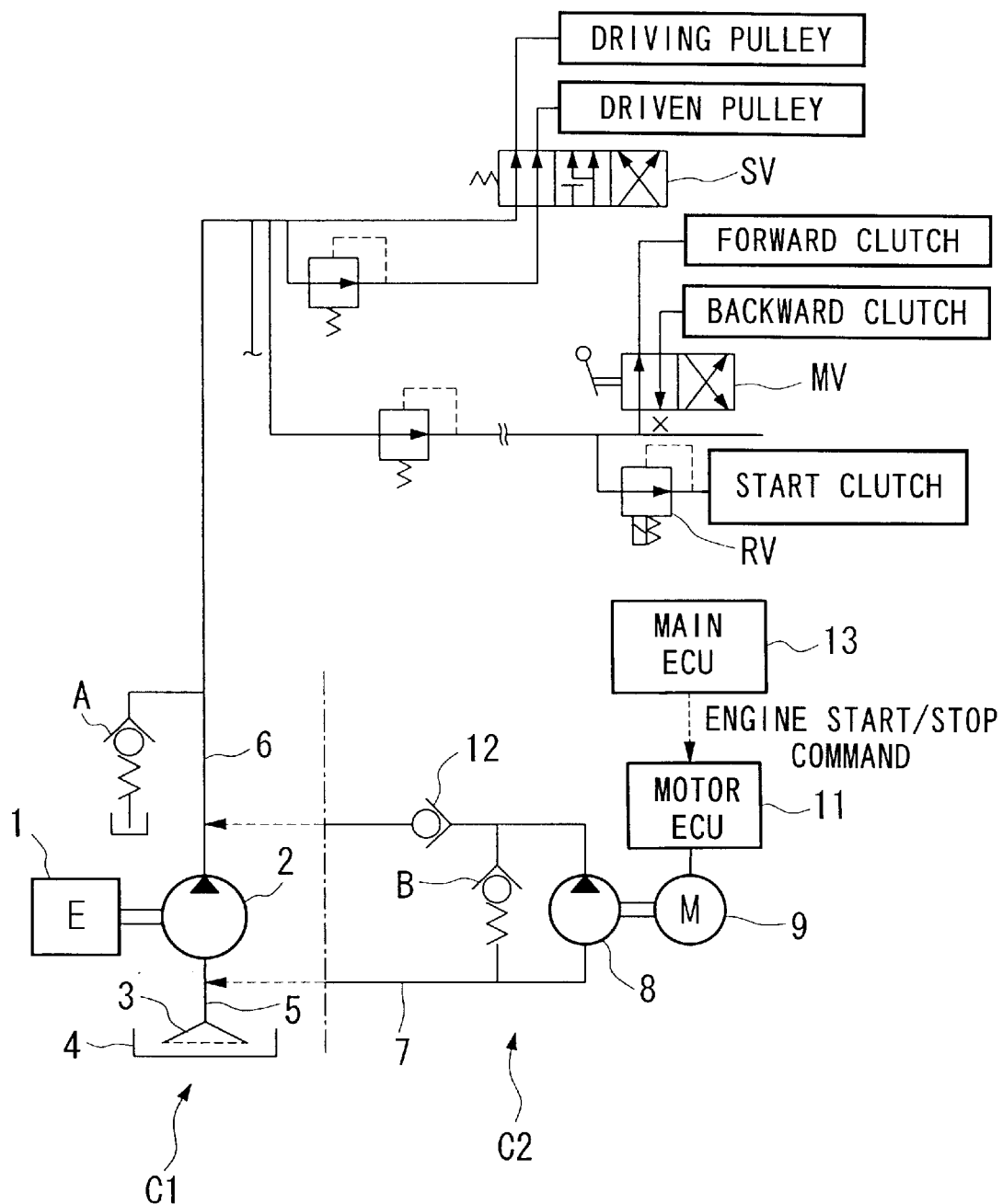
FIG. 1 is a diagram showing the general structure of an embodiment according to the present invention.

FIG. 1 shows the structure of a hydraulic circuit for driving a continuously variable transmission (CVT, a type of transmission used for a vehicle), as an embodiment according to the present invention.

In the figure, a mechanical oil pump 2 suitable for a CVT is connected to engine 1, where piping 5 at the suction side of this mechanical oil pump 2 opens towards oil pan 4 via strainer 3, while a relief valve A (corresponding to the second pressure adjusting device of the present invention) is connected to piping 6 at the supply side of the mechanical oil pump 2. The structural elements such as the mechanical oil pump 2, strainer 3, oil pan 4, and relief valve A form a presently available hydraulic circuit C1 which is positioned at the left side of the alternate long and short dashed line in FIG. 1. Here, hydraulic equipment (not shown) including a shift valve SV connected to a driving pulley for the CVT, a manual valve MV connected to forward and backward clutches, a relief valve RV connected to a start clutch, and the like is connected to the piping 6 at the supply side of the mechanical oil pump 2.

In addition to the presently available hydraulic circuit C1 for the CVT, an extension hydraulic circuit C2 is provided (see the right side of the alternate long and short dashed line in FIG. 1). The extension hydraulic circuit C2 is attached to the oil pan side as shown by dotted arrows in FIG. 1, so as to connect the circuit C2 as a single unit to the relevant piping.

More specifically, bypass passage 7 for connecting the piping 5 at the suction side of this mechanical oil pump 2 and the piping 6 at the supply side of the mechanical oil pump is provided, and an electric oil pump 8 is connected to the bypass passage 7 in a manner such that these pumps are arranged in parallel. In addition, a check valve 12 is inserted in the bypass passage 7 at the supply side of the electric oil pump 8 (see FIG. 1). The electric oil pump 8 is operated using a motor 9. The motor 9 is driven by motor ECU 11 when the ECU receives an engine stop command from a main ECU 13 (explained later). Additionally, a relief valve B (corresponding to the first pressure adjusting device of the present invention) is provided between the check valve 12 and the electric oil pump 8.

According to the check valve 12, it is possible to reliably prevent the back flow of the hydraulic oil from the mechanical oil pump 2. However, two check valves 12 may be provided in series. In this arrangement, if one of the check valves 12 is damaged while the valve is open, the other is effective for preventing the back flow.

The operation of the present embodiment will be explained with reference to the flowchart shown in FIG. 3. In the explanation, FIG. 2, a flowchart showing the general operation applied to the presently available circuit, is also referred to for comparison.

Figure 2:
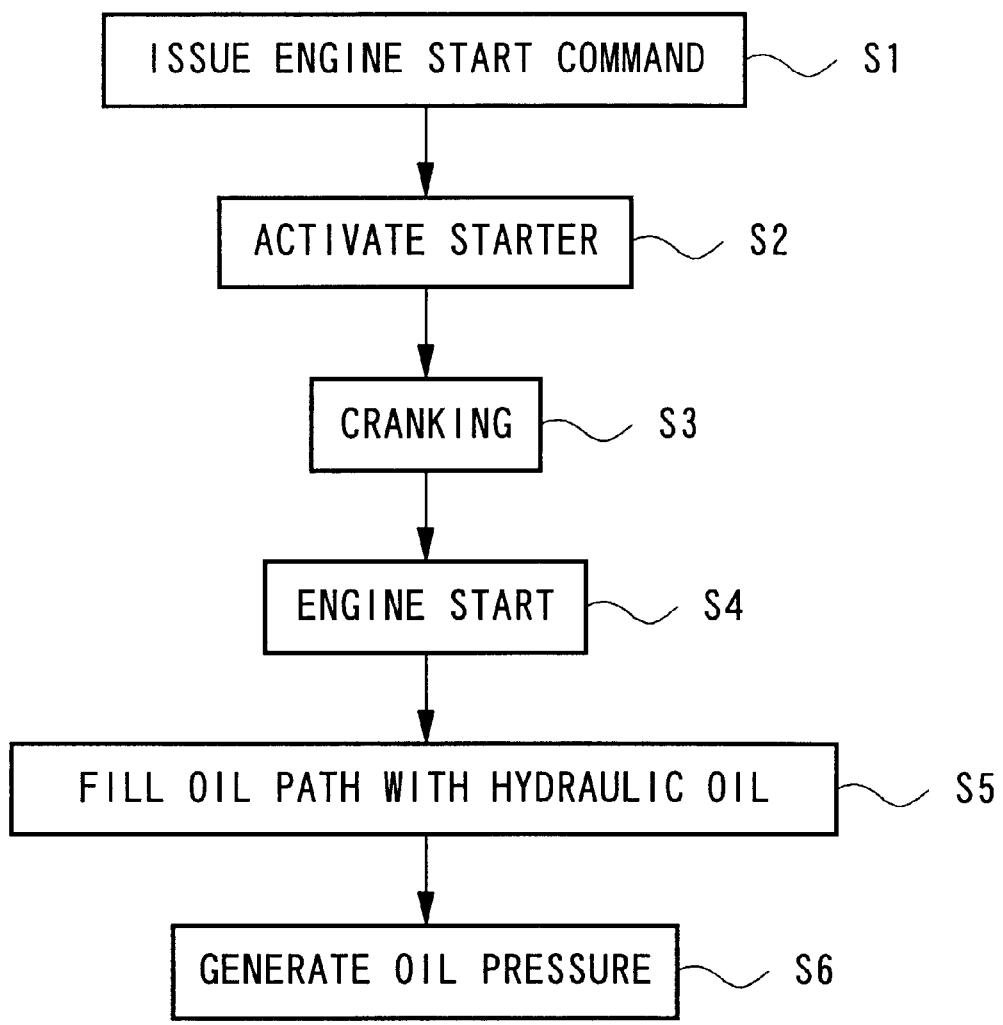
FIG. 2 is a flowchart showing the conventional operation applied to the presently available circuit.

That is, the flowchart of FIG. 2 is applied to a presently available circuit (applied to a mass-produced transmission) only employing the mechanical oil pump 2. In this case, when an engine start command is issued (see step SI), the starter of the vehicle is activated (see step S2), and cranking is carried out (see step S3), so that the engine is started (see step S4). In the next step S5, the relevant oil path is filled with hydraulic oil, and the oil pressure is generated in the following step S6.

Therefore, in a vehicle (driven by the engine) only employing the presently available hydraulic circuit, a driving operation below the idling engine speed is not considered. Therefore, sufficient discharge is not obtained by using the discharge of the mechanical oil pump 12 at the cranking rotation, and a considerable time is necessary from the engine start to the time when the oil path is filled with the hydraulic oil.

Figure 3:
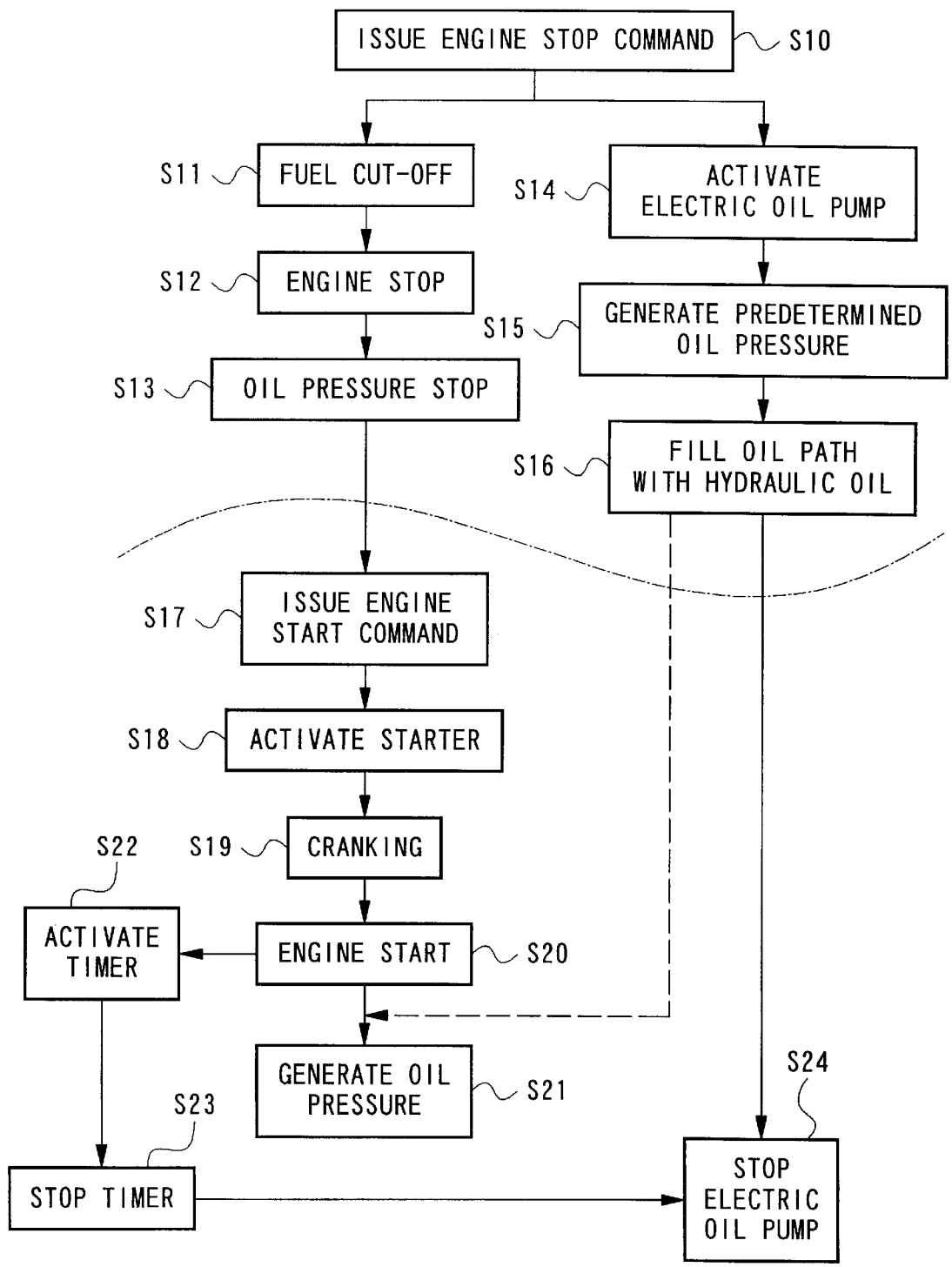
FIG. 3 is a flowchart showing the general operation of the embodiment of the present invention, corresponding to the flowchart of the conventional operation of FIG. 2.

FIG. 3 shows the operational flow of the present embodiment also employing the electric oil pump 8. In the present embodiment, as shown in FIG. 1, whether the engine starting/stopping operation is performed is determined by a dedicated main ECU 13, and the main ECU 13 sends an engine start/stop command to an engine ECU (not shown) and to the motor ECU 11, and the operation proceeds according to the general flowchart shown in FIG. 3. As shown in FIG. 3, when an engine stop command is issued (see step S10), the fuel cut-off is carried out (see step S11), so that the engine is stopped (see step S12) and accordingly, the mechanical oil pump 2 is stopped and the application of oil pressure is stopped (see step S13). Also when the engine stop command is issued in the step S10, the electric oil pump 8 is activated (see step S14), so that a predetermined oil pressure is generated (see step S15) and the oil path is filled with hydraulic oil (see step S16). Accordingly, even if the oil pressure obtained by the mechanical oil pump 2 is released in step S13, the oil path is suitably filled with hydraulic oil by the electric oil pump 8. Generally, the working oil pressure is approximately 10 to 15 $kgf/cm^2$; however, approximately 2 $kgf/cm^2$ is sufficient as the discharge pressure of the electric oil pump 8. This is because, for example, a pressure necessary for compressing the return spring of the clutch piston of the forward and backward clutches is suitable as the discharge pressure of the electric oil pump 8. In step S16, the necessary oil pressure can be easily obtained using little hydraulic oil, because the oil path has already been filled with the hydraulic oil.

Therefore, after an engine start command is issued in step S17 and the starter is activated in step S18, cranking is carried out (see step S19) while hydraulic oil having a certain but small level of high pressure (from 2 to 10 $kgf/cm^2$) is introduced from the mechanical oil pump 2 which is provided for driving the engine. Accordingly, the oil pressure of the transmission gradually increases. As a result, when the engine is started (i.e., complete combustion: the combustion in the engine has reached a specific maximum level) in step S20, an oil pressure sufficient for activating the transmission is generated. Therefore, in step S21, a desired oil pressure is generated immediately after the engine 1 is started.

As explained above, according to the present embodiment in which an electric oil pump (unit) is added to a mass-produced (presently available) transmission, the rise speed of the oil pressure supplied to the transmission when the engine is restarted can be effectively increased (see the arrow in FIG. 4 explained later in detail), and thus it is possible to effectively prevent a delay of the vehicle start due to a delay of engagement of a friction element (i.e., clutch) for operating the transmission.

In addition, in step S22, a timer is activated in synchronism with the engine start (i.e., complete combustion), so as to count a predetermined suitable time from the engine start to the time when sufficient oil pressure is generated by the mechanical oil pump 2, that is, the timer is set to the predetermined time. When the counting of the timer is stopped in step S23, the operation of the electric oil pump 8 is simultaneously stopped (see step S24). Accordingly, the operation (or working) time of the electric oil pump 8 after the engine start can be minimized, thereby saving electric power and improving the durability of the electric oil pump 8.

Figure 4:
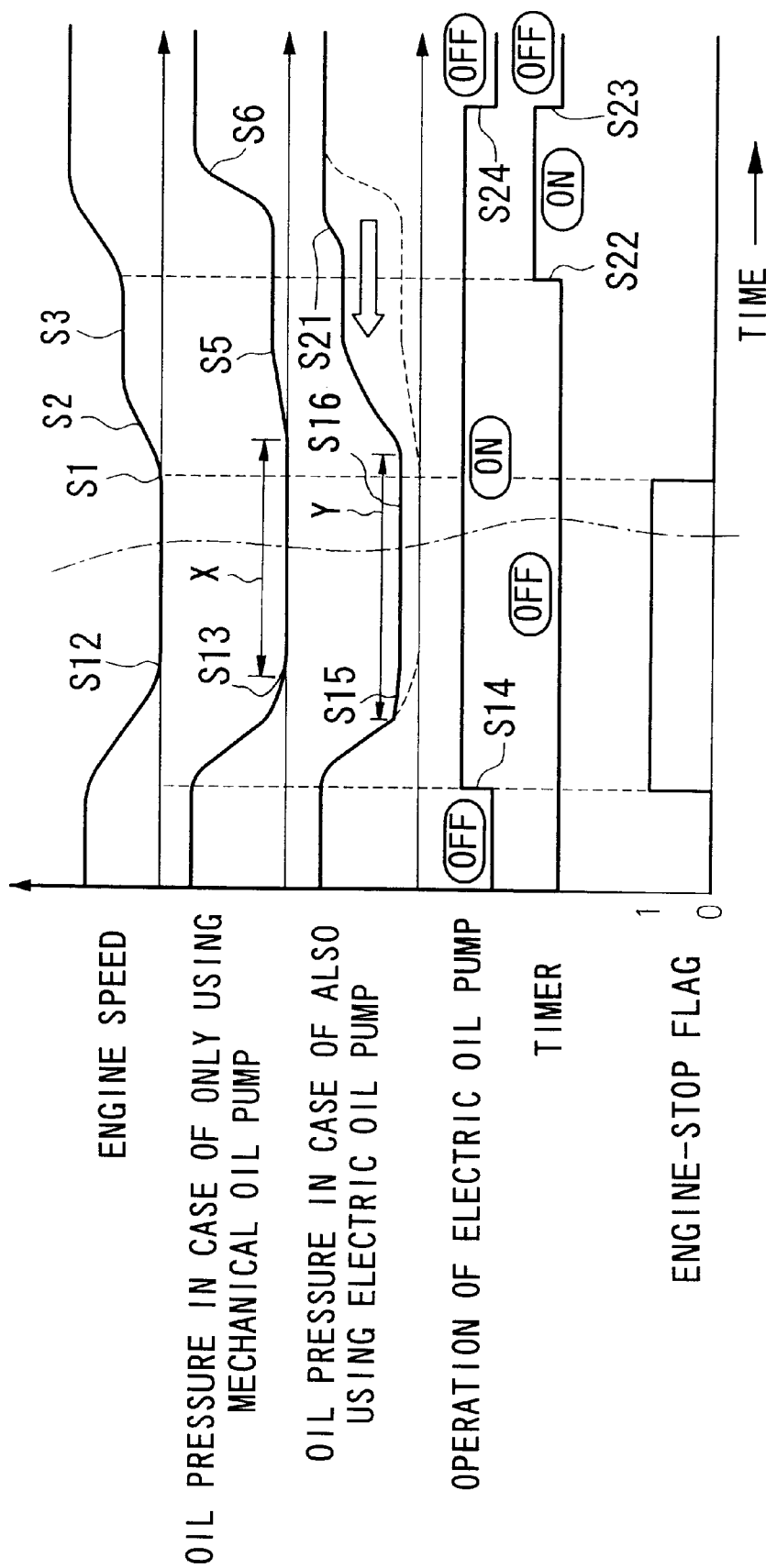
FIG. 4 is a timing chart of the operation of the embodiment according to the present invention.

FIG. 4 is a timing chart in which step numbers corresponding to each step in FIGS. 2 and 3 are indicated. In FIG. 4, the following items are shown from above: (i) the engine speed, (ii) the oil pressure in the case of only using the mechanical oil pump. (iii) the oil pressure in the case of also using the electric oil pump, (iv) the operation of the electric oil pump, (v) the timer, and (vi) the state of an engine-stop flag for permitting the engine stopping operation. When the fuel cut-off is executed, then the engine-stop flag is set to 1, so that the engine stop is permitted.

In the period from the engine stop (according to the engine-stop flag set to 1 (refer to step S12 in FIG. 3)) to the reset of the engine-stop flag, the oil pressure in the case of only using the mechanical oil pump becomes insufficient (see area X in the line indicating the oil pressure in the case of only using the mechanical oil pump in FIG. 4). Here, in the case of also using the electric oil pump, the electric oil pump 8 is activated when the engine-stop flag is set to 1 (see step S14 in FIG. 3); therefore, the oil pressure is sufficiently high in the area Y, and thus a specific oil pressure is maintained in case of using the electric oil pump.

Accordingly, when the engine-stop flag is set to 0, the engine start command is issued (see step S1 in FIG. 2), and the engine speed gradually increases (refer to steps S2 and S3), the oil pressure in the case of using the electric oil pump can be much more quickly and effectively increased (see the arrow in FIG. 4). When the counting using the timer is completed (see step S23 in FIG. 3), the electric oil pump 8 is stopped (see step S24 in FIG. 3), and the oil pressure is then maintained by the mechanical oil pump 2.

According to the timing chart of FIG. 4, as shown by the line indicating the oil pressure in the case of employing the above electric oil pump 8, a predetermined oil pressure can be maintained by using the electric oil pump; thus, sufficient oil pressure to start the engine can be obtained, and thus the necessary oil pressure can be instantly generated. In the line indicating the oil pressure in the case of only using the mechanical oil pump, the oil pressure may become insufficient. However, the oil pressure in the case of also using the electric oil pump can be raised very quickly (see area Y in FIG. 4) so as to compensate for such a loss of oil pressure (see area X in FIG. 4).

Figure 5:
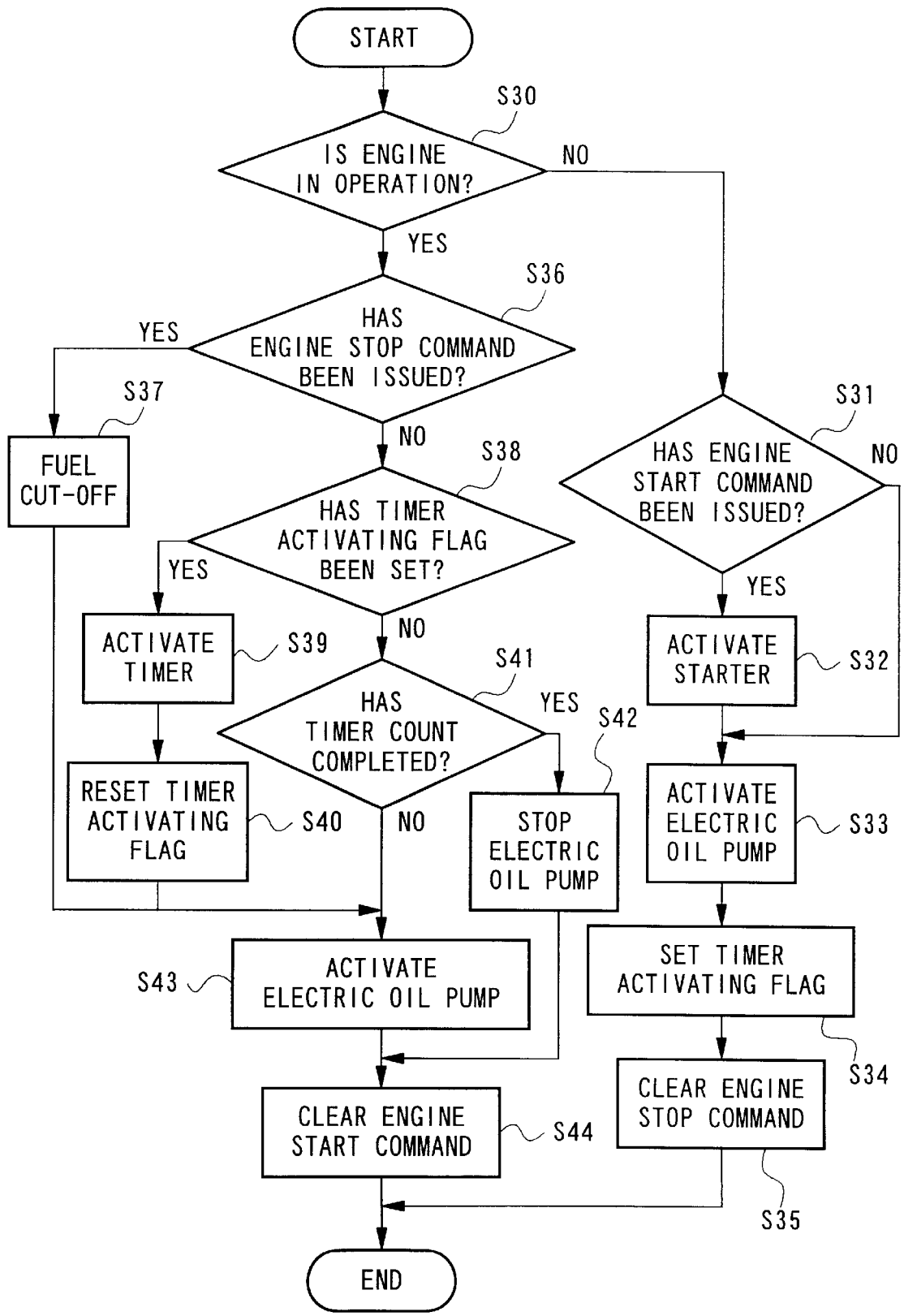
FIG. 5 is a flowchart showing the main operation of the embodiment of the present invention.

Next, the flowchart in FIG. 5, showing the general operation of the present embodiment, will be explained.

In step S30, it is determined whether the engine is in operation. Here, it is determined that the engine is in operation if the engine speed is 2000 rpm or more. If the result of the determining process in S30 is "NO", that is, if it is determined that the engine is currently not in operation, then in step S31, it is further determined whether an engine start command has been issued. If the result is "Yes", then the starter is activated in step S32 and the operation proceeds to step S33. Here, the cranking rotational speed is approximately 300 rpm. If it is determined, in step S31, that no engine start command has been issued, then in step S33, the electric oil pump is activated. In the next step S34, a timer activating flag is set, and the engine stop command is cleared in step S35, so that the relevant control operation is completed.

If it is determined, in step S30, that the engine is in operation, then the operation proceeds to step S36, and in this step, it is determined whether an engine stop command has been issued. If it is determined, in step S36, that the engine stop command has been issued, then in step S37, the fuel cut-off is carried out, and the operation proceeds to step S43. If it is determined, in step S36, that no engine stop command has been issued, then in step S38, it is further determined whether the timer activating flag has been set. If "Yes", then the timer is activated in step S39 and the timer activating flag is reset in step S40, and the operation proceeds to step S43.

If it is determined, in step S38, that the timer activating flag has not been set, then, in step S41, it is further determined whether the timer counting operation has been completed. If "Yes", then in step S42, the operation of electric oil pump 8 is stopped, and the operation in this flow proceeds to step S44. If it is determined, in step S41, that the timer counting operation has not yet been completed, then in step S43, the electric oil pump 8 is activated, and the operation proceeds to step S44. In step S44, the engine start command is cleared, and the relevant control operation is completed.

According to the above-explained embodiment, the electric oil pump 8 can be additionally provided with a relief valve B and check valve 12 (that is, the electric oil pump 8, relief valve B, and check valve 12 form an additional unit), in parallel to mechanical oil pump 2 which is generally provided for and used in a presently available mass-produced transmission.

In addition, according to the check valve 12, it is possible to prevent back flow of the hydraulic oil from the mechanical oil pump 2. On the other hand, back flow from the electric oil pump 8 to the mechanical oil pump 2 can be prevented by defining a low discharge pressure of the electric oil pump 8 and by suitably sealing the mechanical oil pump 2. Therefore, no modification of the structure of the hydraulic circuit C1 of the mass-produced transmission is necessary.

The above check valve 12 may be provided at the suction side of the electric oil pump 8, and similar effects can be obtained also in this arrangement. However, in this case, the discharge pressure of the mechanical oil pump 2 directly acts on the electric oil pump 8; thus, it is necessary to improve the pressure tightness of the electric oil pump 8.

In addition, no check valve is provided in the presently available hydraulic circuit C1; thus, the defined valve opening pressure VB of relief valve B, provided in the hydraulic circuit C2 including the electric oil pump 8, is smaller than the defined valve opening pressure VA of relief valve A of hydraulic circuit C1 (i.e., VA>VB). Accordingly, the oil pressure generated in the hydraulic circuit C2 is not discharged from the relief valve A of the hydraulic circuit C1. Actually, the pressure necessary for filling the hydraulic circuit C1 with the hydraulic oil is lower than the working oil pressure of an ordinary transmission (for example, 2 kgf/cm$^2$ at the highest, where the usual oil pressure is 10 to 15 kgf/cm$^2$); thus, the set pressure of the relief valve B (in the unit having the electric oil pump 8) can also be low, and the pumping can be decreased.

The electric oil pump 8 is activated at the same time that the engine is stopped, so that the hydraulic circuit C1 is always filled with the hydraulic oil. Therefore, when the engine is restarted, it is possible to prevent a delay in the rise of the oil pressure generated by the mechanical oil pump 2, and to decrease a delay of the response to start the vehicle. The electric oil pump 8 is unnecessary after the engine is started; thus, after the engine is restarted and a specific time has elapsed, the operation of the electric oil pump 8 can be stopped. Accordingly, the electric oil pump 8 is not unnecessarily operated.

Below, another embodiment according to the present invention will be explained with reference to FIGS. 6 and 7.

In the previous embodiment, the electric oil pump 8 is stopped by using a timer, but in the present embodiment, motor ECU 11 receives a signal for determining the complete combustion in the engine (i.e., the combustion in the engine has reached a specific maximum level) from an engine ECU, and when it is determined that the combustion in the engine has reached a specific maximum level, the operation of the electric oil pump 8 is stopped.

Figure 6:
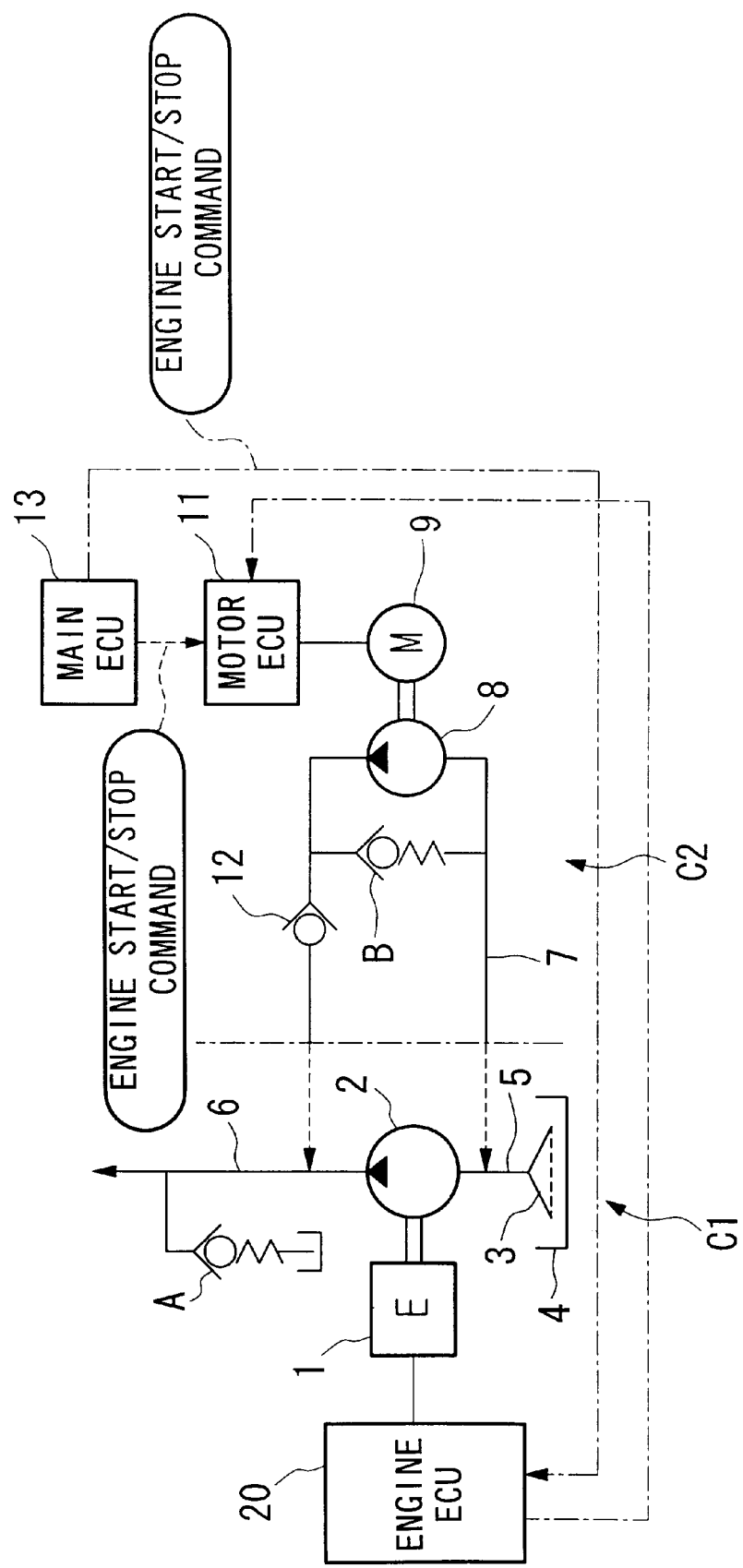
FIG. 6 is a diagram (corresponding to FIG. 1) showing the main portions of the general structure of another embodiment according to the present invention.
Figure 7:
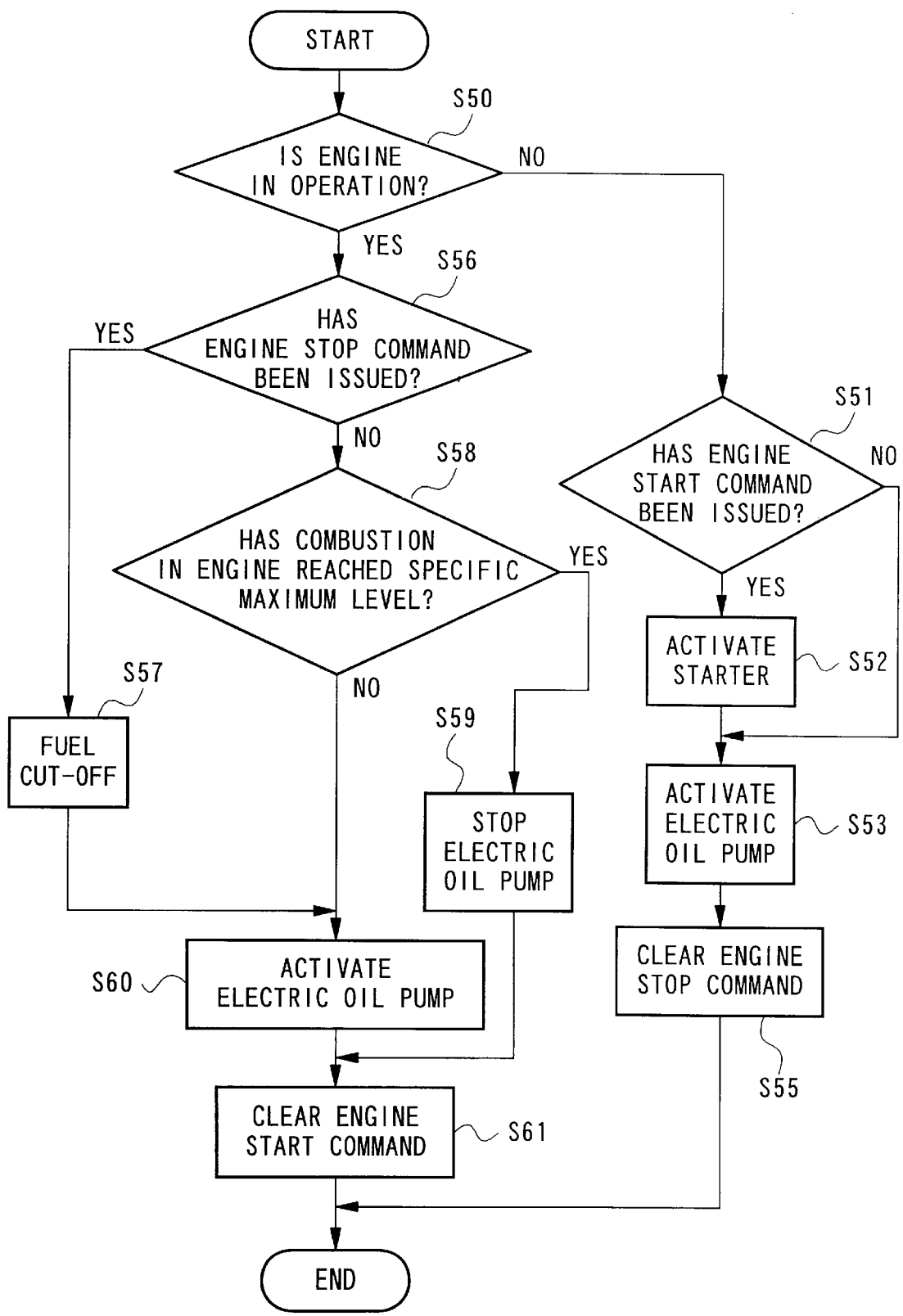
FIG. 7 is a flowchart (corresponding to FIG. 5) showing the main operation of the other embodiment of FIG. 6.
Figure 8:
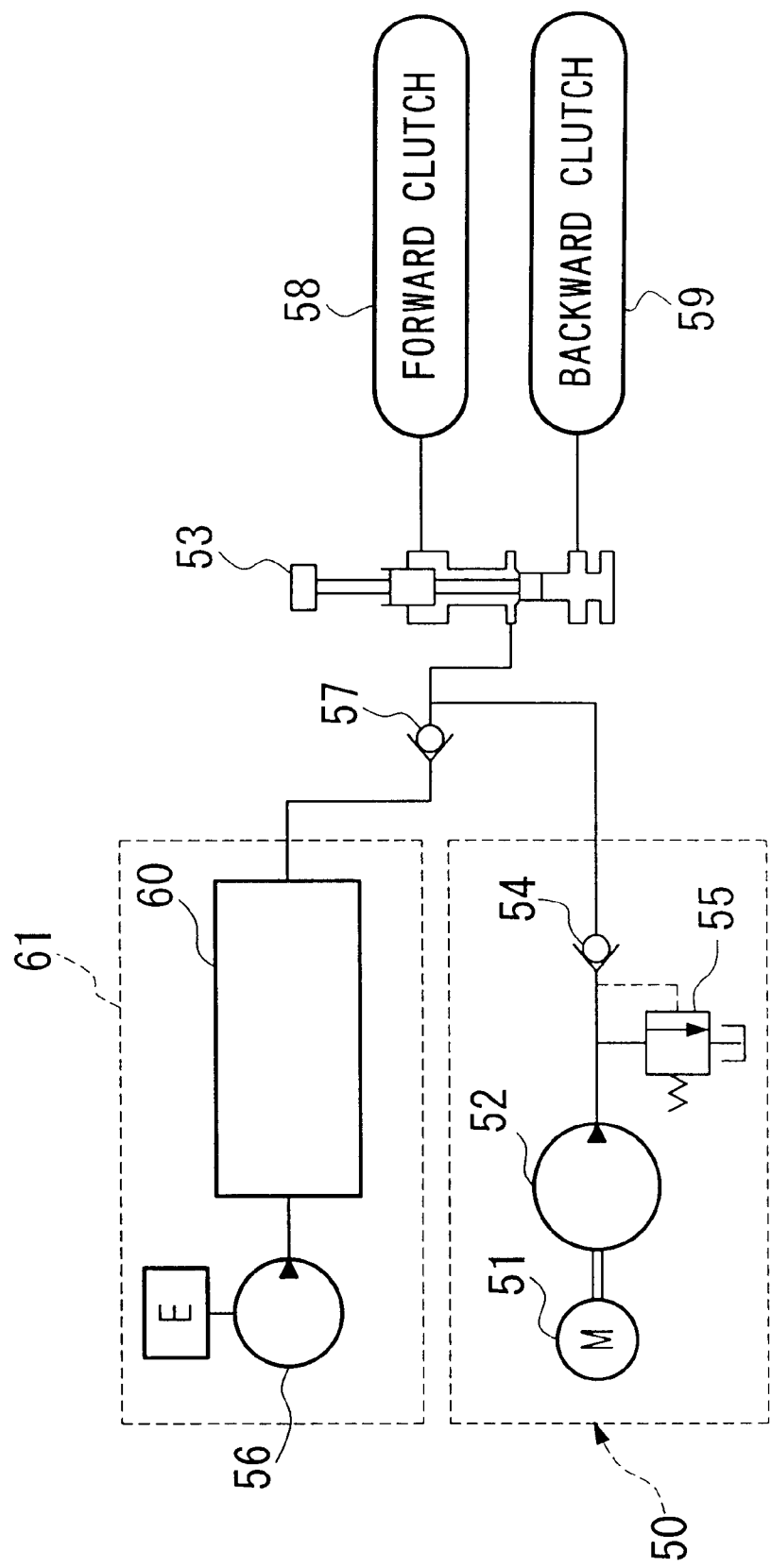
FIG. 8 is a diagram showing a conventional arrangement.

As shown in FIG. 6, similar to the previous embodiment, whether the engine starting/stopping operation is performed is determined by main ECU 13, and a command signal is sent to the engine ECU and motor ECU 11. In addition, a signal for determining the complete combustion (i.e., the combustion in the engine has reached a specific maximum level) of engine 1 is input into motor ECU 11 from engine ECU 20, and based on this signal, motor ECU 11 stops motor 9 so that the operation of the electric oil pump 8 is stopped. FIG. 7 is a flowchart of the operation of the present embodiment, which corresponds to the flowchart of FIG. 5.

In step S50, it is determined whether the engine is in operation. If the result of the determining is "NO", that is, if it is determined that the engine is currently not in operation, then in step S51, it is further determined whether an engine start command has been issued. If the result is "Yes", then the starter is activated in step S52 and the operation proceeds to step S53. Here, the cranking rotational speed is approximately 300 rpm. If it is determined, in step S51, that no engine start command has been issued, then in step S53, the electric oil pump 8 is activated, and the engine stop command is cleared in step S55, so that the relevant control operation is completed.

If it is determined, in step S50, that the engine is in operation, then the operation proceeds to step S56, and in this step, it is determined whether an engine stop command has been issued. If it is determined, in step S56, that the engine stop command has been issued, then in step S57, the fuel cut-off is carried out, and the operation proceeds to step S60. If it is determined, in step S56, that no engine stop command has been issued, then in step S58, it is further determined whether the combustion in the engine has reached a specific maximum level. If the result of the determination is "No", then the operation proceeds to step S60. If it is determined, in step S58, that the combustion in the engine has reached the specific maximum level, then, in step S59, the electric oil pump 8 is stopped and the operation proceeds to step S61. In step S60, the electric oil pump 8 is activated and the operation proceeds to step S61. In step S61, the engine start command is cleared, and the relevant control operation is completed.

Also according to the present embodiment, the pumping operation of the electric oil pump after the engine start can be minimized, similar to the previous embodiment. Therefore, the electric oil pump 8 is not unnecessarily operated, and is used efficiently.

The present invention is not limited to the above-explained embodiments. For example, in FIG. 7 of the above embodiment, the electric oil pump is operated from step S57 (i.e., fuel cut-off) to step S61. However, a process for determining whether the engine is stopped may be performed after the fuel cut-off in step S57, and if the result is "NO", then the operation may proceed to step S61, while if the result is "YES", then the operation may proceed to step S60, thereby much further reducing the pumping operation of the electric oil pump 8. In addition, in the above embodiments, main ECU 13 determines whether the engine staring/stopping operation is performed; however, the engine ECU may perform this determination.

What is claimed is:

1. A hydraulic circuit comprising:
 a control section for controlling the oil pressure supplied to an automatic transmission of a vehicle which has a single-directional mechanical oil pump, driven by an engine, for supplying hydraulic oil to the automatic transmission and which has an automatic engine-stop system, wherein the control section comprises:
 a bypass passage for connecting the suction side and the supply side of the mechanical oil pump; and
 an electric oil pump connected to the bypass passage in a manner such that the mechanical oil pump and the electric oil pump are arranged in parallel.

2. A hydraulic circuit as claimed in claim 1, comprising:
 a check valve, inserted in the bypass passage at the supply side of the electric oil pump, for preventing back flow of the hydraulic oil from the mechanical oil pump to the electric oil pump; and
 a first pressure adjusting device, provided between the check valve and the electric oil pump, for adjusting a discharge pressure of the electric oil pump.

3. A hydraulic circuit as claimed in claim 2, further comprising:
 a second pressure adjusting device for adjusting the discharge pressure of the electric oil pump, where the set pressure of the first pressure adjusting device is smaller than the set pressure of the second pressure adjusting device.

4. A hydraulic circuit as claimed in claim 2, wherein the bypass passage, the electric oil pump, the check valve, and the first pressure adjusting device are added and attached to an oil path of the automatic transmission as a unit.

5. An oil-pressure control system for controlling a hydraulic circuit as claimed in any one of claims 1 to 4, the system comprising:
 an electric oil pump controlling section for activating the electric oil pump if the section receives an engine stop command for stopping the engine, and stopping the electric oil pump if the section receives an engine start command for restarting the engine, wherein the electric oil pump controlling section stops the electric oil pump when a predetermined time has elapsed after the engine restart.

6. An oil-pressure control system for controlling a hydraulic circuit as claimed in any one of claims 1 to 4, the system comprising:
 an electric oil pump controlling section for activating the electric oil pump if the section receives an engine stop command for stopping the engine, and stopping the electric oil pump if the section receives an engine start command for restarting the engine, wherein after the engine restart, the electric oil pump controlling section determines whether the combustion in the engine has reached a specific maximum level, and stops the electric oil pump when it is determined that the combustion in the engine has reached the specific maximum level.

7. An oil-pressure control method for controlling a hydraulic circuit as claimed in any one of claims 1 to 4, the method comprising the step of:
 activating the electric oil pump if an engine stop command for stopping the engine is received, and stopping the electric oil pump if an engine start command for restarting the engine is received, wherein the electric oil pump is stopped when a predetermined time has elapsed after the engine restart.

8. An oil-pressure control method for controlling a hydraulic circuit as claimed in any one of claims 1 to 4, the method comprising the step of:
 activating the electric oil pump if an engine stop command for stopping the engine is received, and stopping the electric oil pump if an engine start command for restarting the engine is received, wherein after the engine restart, it is determined whether the combustion in the engine has reached a specific maximum level, and the electric oil pump is stopped when it is determined that the combustion in the engine has reached the specific maximum level.

\* \* \* \* \*